(12) United States Patent
Apte

(10) Patent No.: US 6,937,976 B2
(45) Date of Patent: Aug. 30, 2005

(54) METHOD AND SYSTEM FOR TEMPORARY NETWORK IDENTITY

(75) Inventor: Naresh Anant Apte, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 790 days.

(21) Appl. No.: 09/901,518

(22) Filed: Jul. 9, 2001

(65) Prior Publication Data

US 2003/0009593 A1 Jan. 9, 2003

(51) Int. Cl.[7] .................................................. H04L 9/00
(52) U.S. Cl. ......................................... 704/74; 704/75
(58) Field of Search ..................... 705/74, 75; 713/180, 713/201; 455/403, 432.1, 446, 445

(56) References Cited

U.S. PATENT DOCUMENTS

| | | | |
|---|---|---|---|
| 5,475,735 A | * 12/1995 | Williams et al. | ............ 455/403 |
| 5,812,670 A | 9/1998 | Micali | |
| 5,905,736 A | 5/1999 | Ronen et al. | |
| 5,961,593 A | * 10/1999 | Gabber et al. | ................ 705/74 |
| 6,119,000 A | * 9/2000 | Stephenson et al. | ..... 455/432.1 |
| 6,137,884 A | * 10/2000 | Micali | ......................... 713/180 |
| 6,148,342 A | 11/2000 | Ho | |
| 6,571,092 B2 | * 5/2003 | Faccin et al. | ................ 455/445 |
| 6,697,625 B1 | * 2/2004 | Rune | .......................... 455/446 |
| 2002/0129279 A1 | * 9/2002 | Spacey | ....................... 713/201 |

FOREIGN PATENT DOCUMENTS

| JP | 2001-243300 | * 9/2001 | ........... G06F/17/60 |
|---|---|---|---|
| WO | WO 03/094475 A1 | * 11/2003 | ............. H04L/9/00 |

OTHER PUBLICATIONS

"Global System for Mobile Communications", Beaudry et al, Telesis, n94, pp. 52–59 (Jul. 1992).*

* cited by examiner

*Primary Examiner*—Salvatore Cangialosi

(57) ABSTRACT

A method for network communications comprises assigning a temporary fictitious identity from a identity intermediary to at least one of a service provider and a user interface and performing a transaction between the user interface and the service provider using the temporary fictitious identity. A network identity intermediary system comprises a controller configured for assigning a temporary identity to at least one of a user interface and a service provider, and a database configured for maintaining private information of the at least one user interface and service provider in association with the temporary fictitious identity.

31 Claims, 6 Drawing Sheets

METHOD AND SYSTEM FOR TEMPORARY NETWORK IDENTITY

THE FIELD OF THE INVENTION

The present invention relates to network browsing, and more particularly, to information privacy in network browsing.

BACKGROUND OF THE INVENTION

The Internet has created an entirely new form of commerce. Consumers can browse on the internet among many different online merchants that provide information and/or goods and services. However, while most people can shop within a retail center in relative anonymity, those surfing the web typically must reveal more information about themselves than is desirable.

Accordingly, this new commercial freedom comes at potentially large price. Consumers are increasingly subject to theft of their identities. Unscrupulous people capture an unsuspecting consumer's social security number, or other vital information, and then assume the consumer's personal and financial identity. Of course, part of the increasing trend of identity theft arises from the great frequency that consumers are asked to divulge personal data and financial data to carry out a financial transaction or obtain some service. Accordingly, for internet commerce to survive and thrive, the problem of personal and financial identity theft must be tackled.

In response, various privacy service providers have attempted to restore consumers to a state of anonymity while searching the web. For example, at least one type of conventional service provider permits users to pass through their web server, which blocks any personal identity information on the user's web browser from being observed by an online information or goods/services merchant. However, anonymous web browsing will not be useful for those desiring to carryout a transaction on the Internet, since the online merchant or service provider must know who they are providing the services to, have assurance of receiving payment, and must know where to deliver any information, goods, and/or services.

On the other hand, other conventional service providers will certify the identity of a web user or of an online merchant so that each partner in an information or goods/services transaction is assured of whom they are dealing with. These service providers also commonly offer to provide a payment receiving service for the online merchants to permit users to securely pay by credit card without getting their credit information intercepted by computer thieves Unfortunately, all of these conventional systems lack in one regard or another. Anonymous web browsing prevents many desirable financial or information transactions since the service provider needs to know who will receive the services and the method of payment. On the other hand, while certification of one's identity assures transactional partners of who they are dealing with and can offer secure payment systems, much personal and information is revealed from the user to an online merchant. Accordingly, for those seeking to limit the personal information divulged while still carry out a network transaction, a quandary is faced. Either remain anonymous and forgo many advantageous commercial transactions on the internet, or forfeit your anonymity and hope that certification and secure payment systems will provide sufficient protection and security for your personal and financial information.

SUMMARY OF THE INVENTION

A method for network communication of the present invention comprises assigning a temporary identity from an identity intermediary to at least one of a service provider and a user interface and performing a transaction between the user interface and the service provider using the temporary identity.

A network identity intermediary system of the present invention comprises a controller configured for assigning a temporary identity to at least one of a user interface and a service provider, and a database configured for maintaining private information of the at least one user interface and service provider in association with the temporary identity.

DESCRIPTION OF THE PREFERRED EMBODIMENTS

Figure 1:
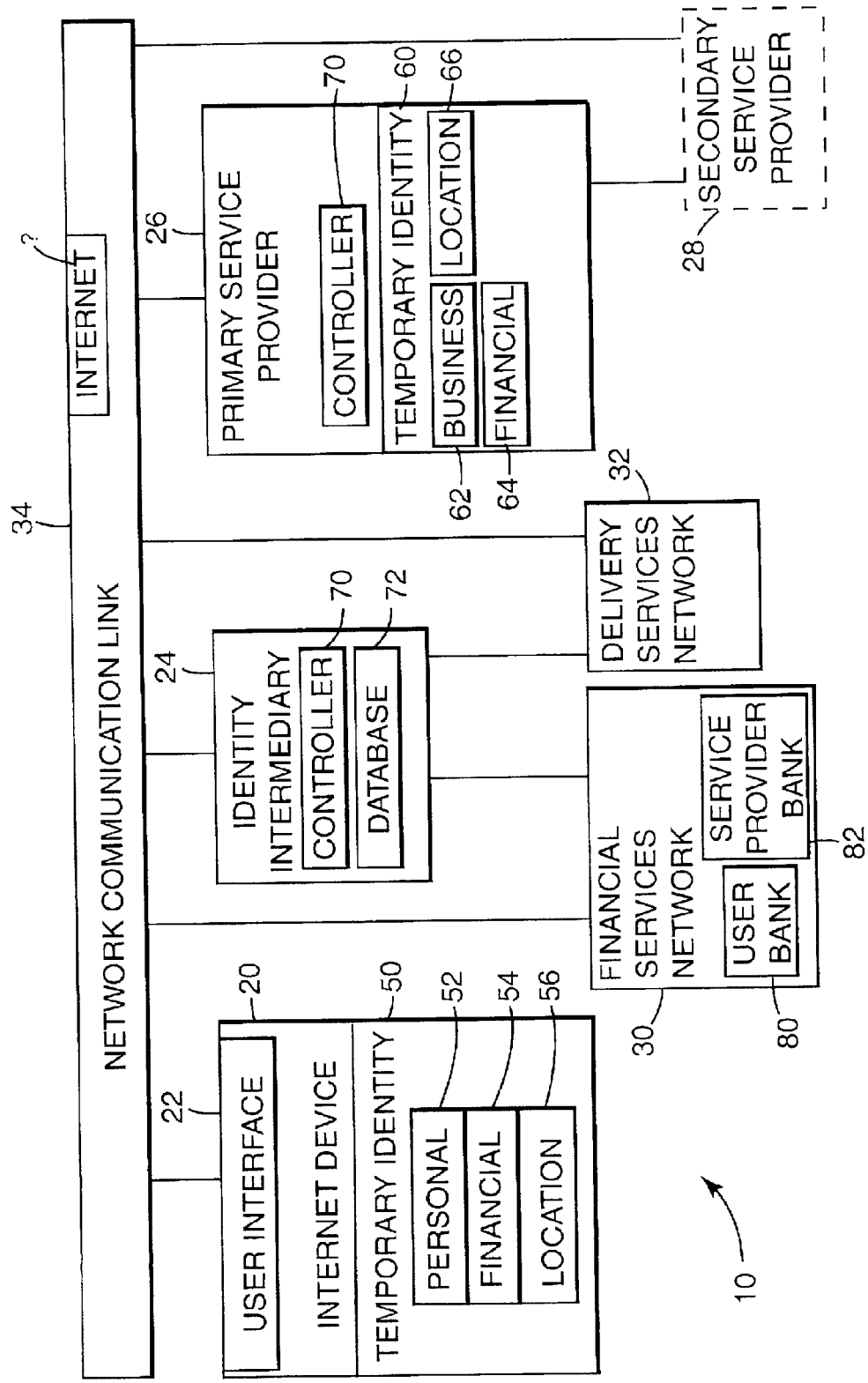
FIG. 1 is a block diagram of an identity intermediary system, according to one embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A method and system of the present invention facilitates pseudonymous network transactions between a user interface and a service provider by providing at least one, or both of the user interface and the service provider with a temporary network identity that is unique and definite, but fictitious. Despite the fictitious nature of the temporary identity, the user interface and the service provider are willing to undertake the transaction because of the trust engendered by the nature and recognizable source of the identity intermediary that issues the temporary identity. The transaction can be an exchange of information only, or can also include financial information as well as location information. The identity intermediary also can perform financial transactions and delivery services between the user interface and the service provider to facilitate the transaction occurring pseudonymously.

The method and system of the present invention provides consumers and businesses with an alternative to anonymous web browsing in that a real information exchange can occur or service be provided while preserving the security and privacy of personal or business information. It is difficult in conventional anonymous web browsing to send or receive payment or goods/services when the partners to the transaction do not know who they are dealing with. Moreover, the method and system of the present invention provides an advantage over services which merely certify the known real identity of a transaction partner. In that conventional arrangement, the transaction is carried out because each partner is assured of the identity of the other partner through certification. However, the partners cannot do so without revealing their identity, which may not be desirable for a variety of privacy, strategic or other concerns. Accordingly, a method and system of the present invention alleviates these problems by fostering transactions using unique and definite, yet fictitious identities that can be trusted because of their issuance by a know identity intermediary. In addition, the fictitious identities are temporary and uniquely and randomly assigned for each transaction so that the identities cannot be co-opted by either partner to the transaction or by unscrupulous third parties.

Components of the present invention may be implemented in hardware via a microprocessor, programmable logic, or state machine, in firmware, or in software within a given device. In one aspect, at least a portion of the software programming is web-based and written in HTML and JAVA programming languages, including links to graphical user interfaces, such as via windows-based operating system. The components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may reside in software on one or more computer-readable mediums. The term computer-readable mediums as used herein is defined to include any kind of memory, volatile or non-volatile, such as floppy disks, hard disks, CD-ROMs, flash memory, read-only memory (ROM), and random access memory (RAM).

A system according to the present invention is illustrated generally at 10 in FIG. 1. System 10 includes internet-capable device 20 having user interface 22, identity intermediary 24, primary service provider 26, secondary service provider 28, financial services network 30, and delivery services network 32. System 10 also further comprises network communication link 34.

System 10 further comprises temporary identity 50, which is associated with user interface 22, and which includes personal component 52, financial component 54, and/or location component 56. Likewise, system 10 includes business temporary identity 60, which is associated with primary service provider 26, and which includes business component 62, financial component 64, and/or location component 66.

Both identity intermediary 24 and primary service provider 26 include controller 70 while identity intermediary 24 further comprises database 72. Finally, financial services network 30 includes user bank 80 and service provider bank 82.

User interface 22 on Internet-capable device 20 permits user access to system 10. User interface 22 is preferably an Internet browser such as Internet Explorer® or Netscape Navigator®. Internet device 20 includes, for example an input device such as a keyboard and/or mouse and a display device such as a monitor, as is well known in the art. Accordingly Internet device 20 may include a desktop computer, notebook computer, personal digital assistants (PDA), mobile phone or other device known in the art, such as Internet appliances, for conducting network and Internet communications.

In one aspect, user interface 20 runs on an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows". Each window has its own adjustable boundaries which allow the user to enlarge or shrink the application or document relative to the display screen. Each window can act independently, including its own menu, toolbar, pointers, and other controls, as if it were a virtual display device. Other software tools may be employed via the window, such as a spreadsheet for collecting data. One preferred operating system is a Windows® brand operating system sold by Microsoft Corporation. However, other operating systems which provide windowing environments may be employed, such as those available from Apple Corporation or IBM. Alternatively, a non-windowing environment may be employed.

Identity intermediary 24 is any network site capable of being accessed via network communication link 34, and which provides temporary identities to facilitate pseudonymous network communications and transactions between service providers 26 and user interface 22.

Identity intermediary 24, including controller 70, can be implemented in hardware via a microprocessor, programmable logic device, or state machine, and firmware, or in software within a given device. In one aspect, at least a portion of the software programming is written in Java programming language, and each of the main components communicate using a communication bus protocol. For example, the present invention optionally can use a TCP/IP protocol suite for data transport. Other programming languages in communication bus protocols suitable for use with system 10 will be apparent to those skilled in the art.

Controller 70 includes hardware, software, firmware or combination of these. In one preferred embodiment controller 70 includes a computer server or other microprocessor based system capable of performing a sequence and logic operations. In addition, controller 70 can include a microprocessor embedded systems/appliance incorporating tailored appliance hardware and/or dedicated single purpose hardware. Controller 70 for primary service provider 26 is configured substantially similar to controller 70 of identity intermediary 24.

Network communication link 34, as used herein, includes an Internet communication link (e.g., the Internet), an intranet communication link, or similar high-speed communication link. In one preferred embodiment, network communication link 34 includes an Internet communication link 35. Internet communication link 35 permits communication between user interface 22, identity intermediary 24, primary service provider 26, secondary service provider 28, financial services network 30, and delivery services network 32.

Primary service provider 26 is any network based entity that performs transactions with user interface 22. Transactions include providing information, or exchanging information, as well as sending and receiving financial payment and other financial exchanges. Finally, transactions include delivery or reception of goods and services between primary service provider 26 and user interface 22. Service provider 26 ordinarily operates as an online storefront on the World Wide Web or other network navigable by user interface 22. Secondary service provider 28 is associated with primary service provider 26 and acts as a subcontractor to provide one or more components of information and/or goods/services offered by primary service provider 26. For example, user interface 22 may contact primary service provider 26 for travel services in which case primary service provider 26 directs user interface 22 to secondary service provider 28 for making hotel reservations.

Financial services network 30 comprises one or more entities necessary to initiate and complete electronic financial transactions between user interface 22 and primary service provider 26. User bank 80 is a bank or credit institution associated with user interface 22 while service provider bank 82 is a bank or credit institution associated with primary service provider 26 or secondary service provider 28. Delivery services network 32 provides delivery of goods and services between user interface 22 and primary service provider 26 either electronically or physically (e.g. FedEx®).

Figure 2:
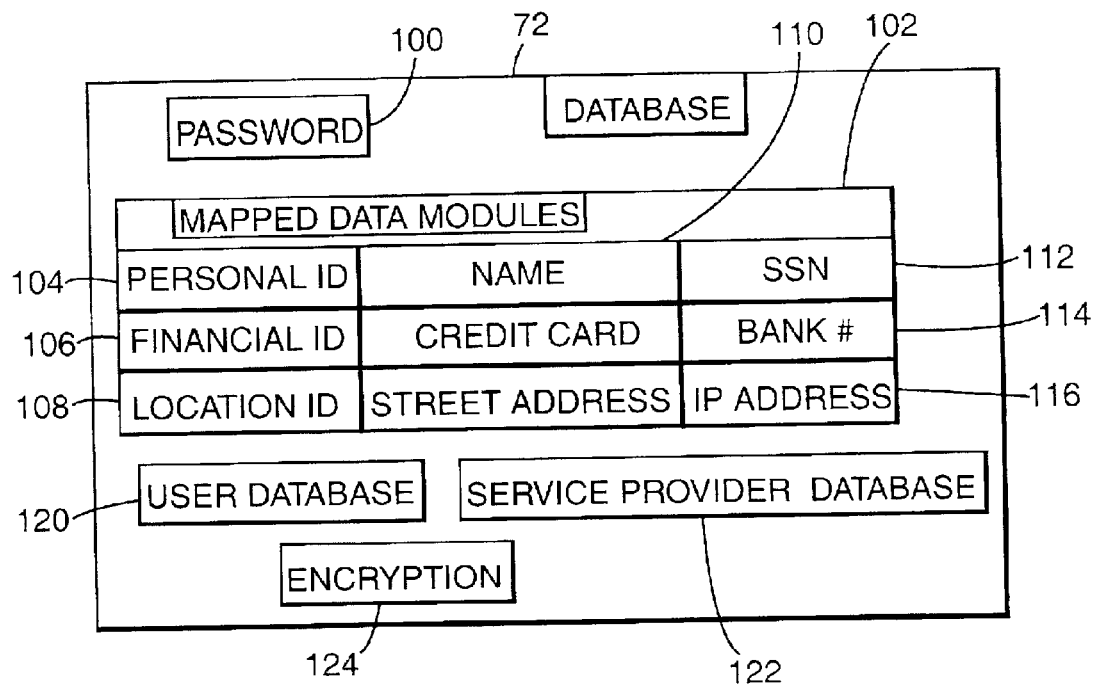
FIG. 2 is a block diagram of a database of an identity intermediary system, according to one embodiment of the present invention.

To provide user interface 22 or primary service provider 26 with a temporary identity, identity intermediary 24 operates database 72. As shown in FIG. 2, database 72 further includes one or more mapped data modules 102, which store temporary identities issued by identity intermediary 24 and corresponding personal information associated with user interface 22 or primary service provider 26. In particular, module 102 includes personal ID 104, financial ID 106, and location ID 108, as well as name 110, Social Security number (SSN) 112, credit card/bank number 114 and street address/IP address 116. Database 72 further comprises individual components such as user database 120 and server provider database 122, as well as encryption function 124.

Personal ID 104, financial ID 106, and location ID 108, each form a component of a temporary identity issued by identity intermediary 24. Only one, or any combination of these components, can comprise temporary identity 50 or 60. In particular, once assigned to user interface 22, personal ID 104, financial ID 106, and location ID 108, respectively correspond to personal ID 52 financial ID 54 and location ID 56 of temporary identity 50 for user interface 22, and respectively correspond to business ID 62, financial ID 64, and location ID 66 of temporary identity 60 for primary service provider 26.

Each of these components provides a fictitious or pseudonymous identity temporarily associated with user interface 22 or primary service provider 26 to facilitate network transactions between user interface 22 and primary service provider 26 while maintaining some level of privacy and security as to who is part of the transaction and as to what information is conveyed. Accordingly, personal ID 104 is a temporary pseudonymous identity associated with a real personal name 110 and other information which uniquely identifies the person such as a Social Security number 112. Financial ID 106 is a temporary pseudonymous identity associated with real unique financial information that is used by the person or entity to carry out financial transactions such as credit card/bank number 114. Finally, location ID 108 is a temporary pseudonymous identity associated with a real physical location or network location at which the person or entity resides for sending and/or receiving good/services, such as street address/IP address 116.

User database 120 represents a plurality or array of modules 102 that include a variety of temporary identities (104,106,108) associated with personal information of consumers for user interfaces 22. Likewise service provider database 122 represents a plurality of modules 102 that include a variety of temporary identities (104,106,108) associated with business information of service providers that transact with consumers via user interfaces 22. Each temporary identity is exclusively associated with a single real identity (personal, financial, and/or location). Finally, encryption function 124 permits database 72 to be encrypted with secure data mapping techniques known to those skilled in the art to maintain the privacy of information of consumers and service providers, as well as to protect the security of the assigned to the temporary identities (104,106,108) to the real identities for preserving the pseudonymous status of user interfaces 22 and/or service providers 26 in network transactions.

Figure 3:
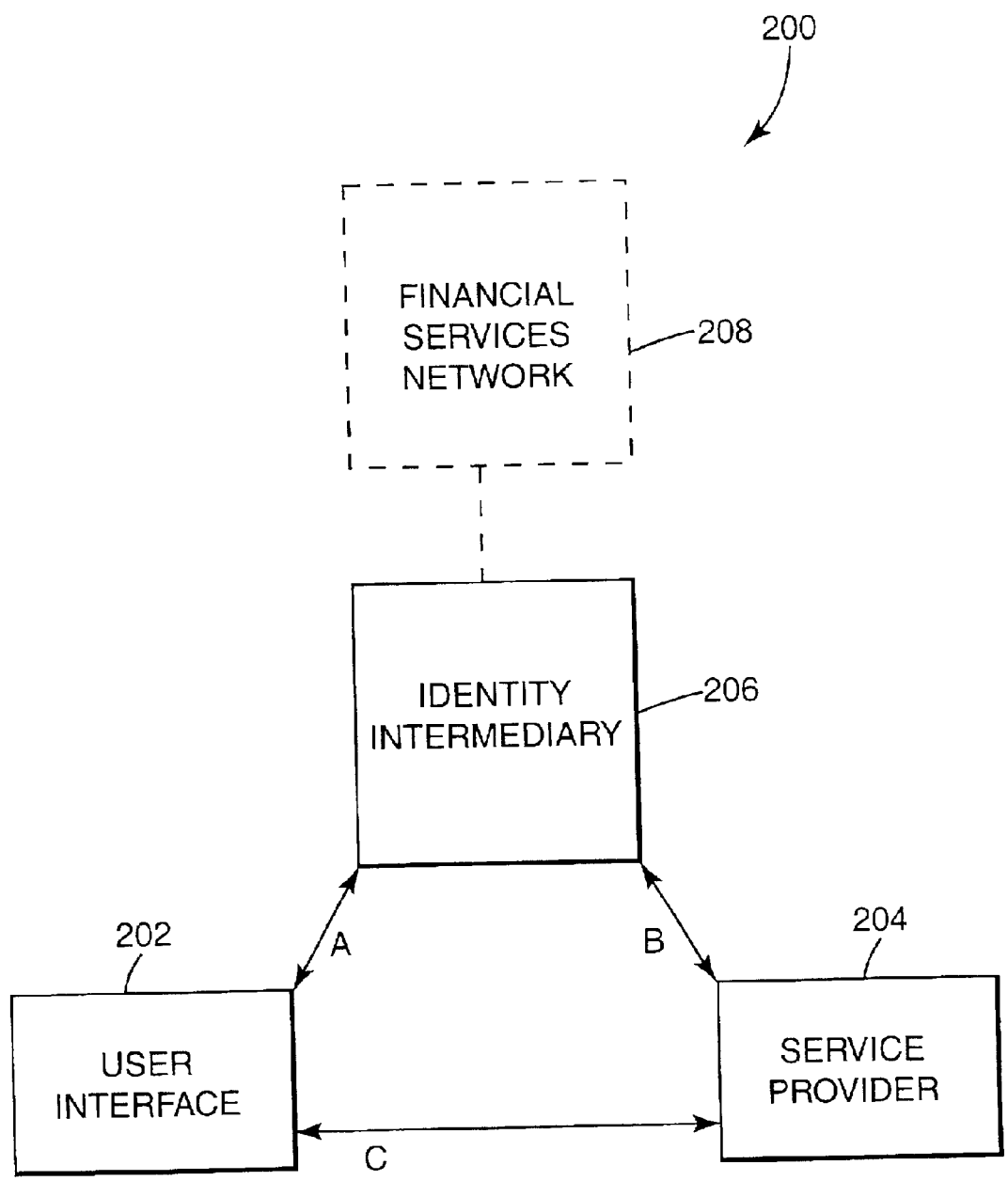
FIG. 3 is a block diagram of a communication pathway of an identity intermediary system, according to one embodiment of the present invention.

FIG. 3 illustrates a pattern of communication pathways between user interface 22, service provider 26 and identity intermediary 24, including pathways A, B, and C. In a first arrangement, user interface 22 first contacts identity intermediary 24 via pathway A to obtain a temporary identity prior to contacting service provider 26. After obtaining the temporary identity, user interface 22 proceeds to contact service provider 26 via pathway B or pathway C. Pathway B is used when identity intermediary 24 allows user interface 22 to pass through controller 70 of identity intermediary 24 to block any personally identifiable information associated with user interface 22, such as a Web browser, from being viewed by service provider 26.

Alternatively, once the temporary identity is assigned to user interface 22, user interface 22 may proceed to contact service provider 26 via pathway C. In this arrangement, the temporary identity is provided by a mask associated with user interface 22 that does not require each network communication to be passed through identity intermediary 24 to maintain the pseudonymous status of user interface 22.

In another arrangement, user interface 22 first contacts service provider 26 via pathway C. Then, either at the initiative of user interface 22 or of service provider 26, a temporary identity is sought from identity intermediary 24 for user interface 22 and/or service provider 26 via pathway B. Once the temporary identity is assigned to either one or both of user interface 22 and service provider 26, then user interface 22 and service provider 26 carry out the desired network transactions between them.

Finally, when a network transaction between user interface 22 and service provider 26 includes financial information, financial services network 30 is optionally available to identity intermediary 24 so that identity intermediary 24 can facilitate a real financial transaction between user interface 22 and service provider 26 while maintaining the pseudonymous status of user interface 22 and/or service provider 26 with respect to each other.

Figure 4:
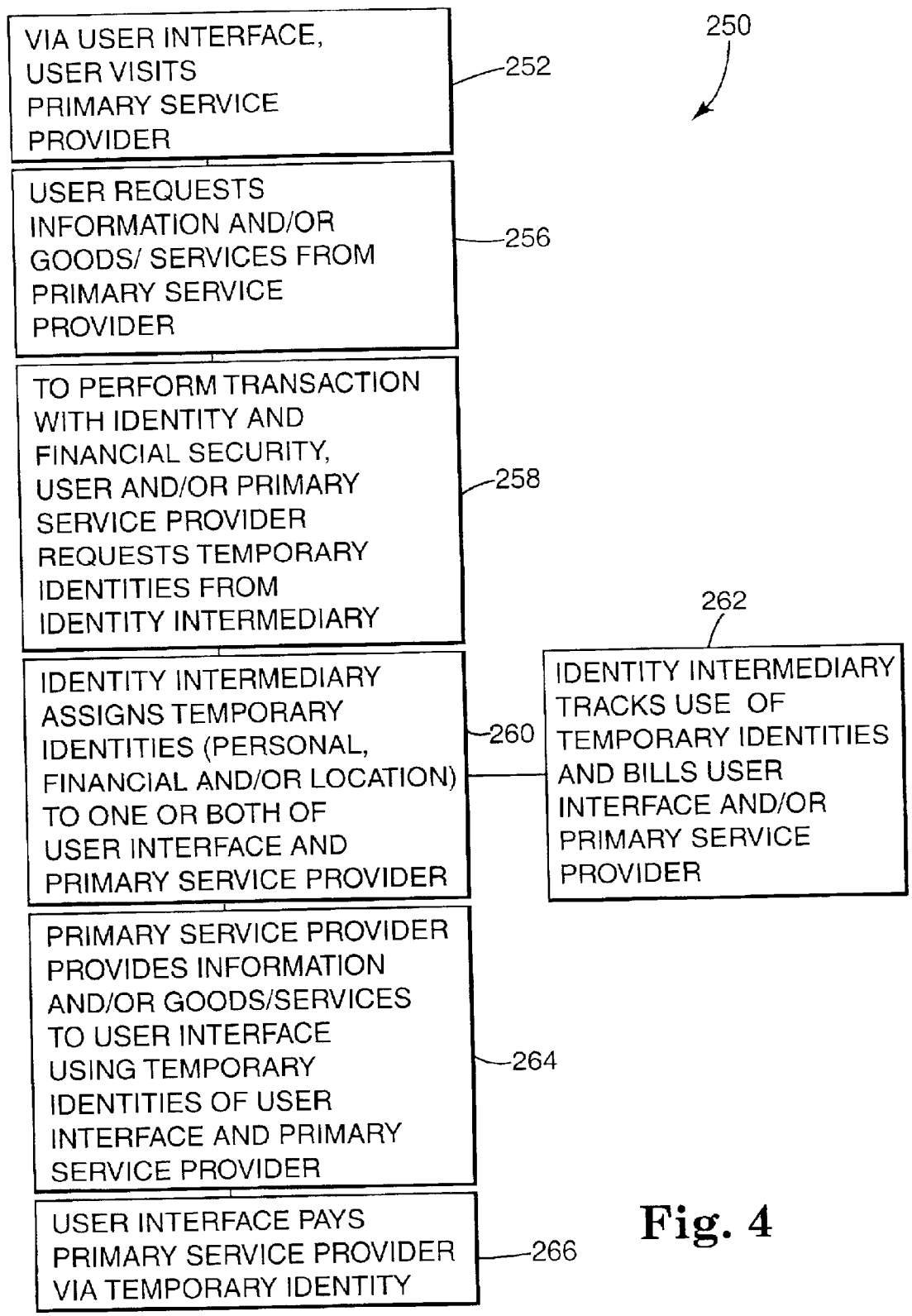
FIG. 4 is a flow diagram of an identity intermediary method, according to one embodiment of the present invention.
Figure 5:
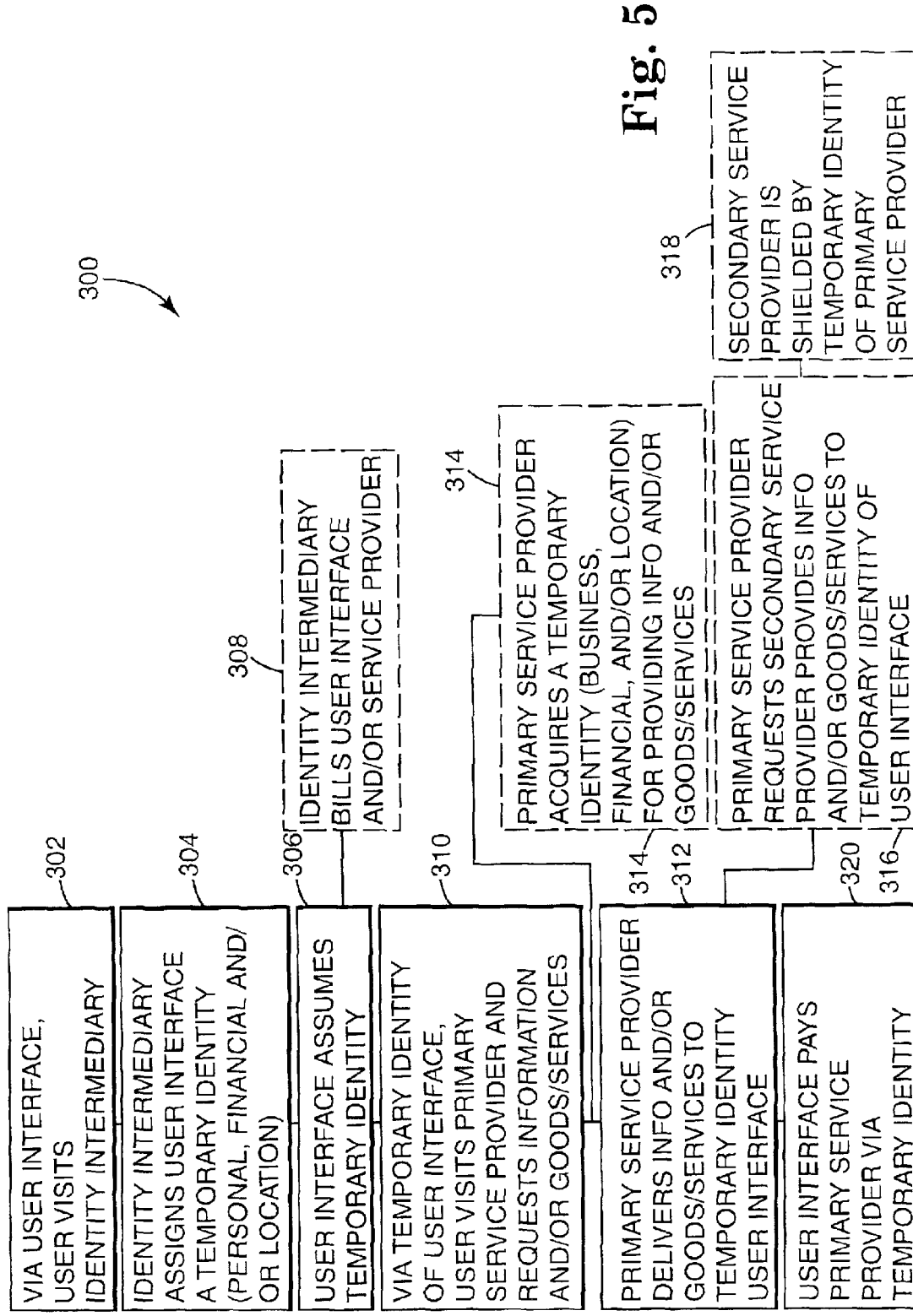
FIG. 5 is a flow diagram of an alternate identity intermediary method, according to one embodiment of the present invention.

FIG. 4 illustrates a method 250 of network transactions of the present invention using system 10 and communication pathways 200. In a first step (252), via user interface 22, a user contacts primary service provider 26. Next, the user requests information and/or goods/services from primary service provider 26 via user interface 22 (step 256). To perform a network transaction with personal identity and financial security, user interface 22 and/or primary service provider 26 requests a temporary identity from identity intermediary 24 (step 258). Identity intermediary 24 then assigns temporary identities (e.g. personal ID 104, financial ID 106, and/or location ID 108) to one or both of user interface and primary service provider 26 (step 260). As identity intermediary 24 assigns temporary identities, it tracks the use of those identities and optionally bills user interface 22 and/or primary service provider 26 to receive payment for the service of providing and maintaining those identities (step 262). Primary service provider 26 then provides information and/or goods/services to user interface 22 using the temporary identities of user interface 22 and/or primary service provider 26 (step 264). Where the network transaction between user interface 22 and primary service provider 26 is a financial one, then user interface 22 pays primary service provider 26 via a temporary identity, such as financial ID 106. Similarly, where primary service provider 26 provides goods/services to user interface 22, and those goods are delivered to the user at a real physical location or network address via location ID 108.

In another method 300, prior to contacting any service providers 26 via user interface 22, consumer visits identity intermediary 24 (step 302). Identity intermediary 24 assigns user interface 22 a temporary identity, such as one or more of personal ID 104, financial ID 106 and location ID 108 (step 304). User interface 22 assumes the temporary identity by Web browser masking, or passing through a server of identity intermediary 24, using techniques known to those skilled in the art (step 306). At this point in time or later, identity intermediary optionally bills user interface 22 and/or service provider 26 for the service of providing a maintaining the temporary identity.

Next, via temporary identity of user interface 22, the user visits primary service provider 26 and requests information and/or goods/services (step 310). Primary service provider 26 delivers the information or goods services to user interface 22 using the temporary identity (step 312). Prior to step 312, primary service provider 26 optionally acquires a temporary identity for themselves (business, financial, and/or location) for providing information and/or goods/services to user interface 22 (step 314).

Next, as part of providing information or goods and services to user interface 22, primary service provider 26 optionally requires secondary service provider 28 to provide a portion or all of the information and/or goods/services to user interface 22 via the temporary identity of user interface 22 (step 316). In a further optional step, the activity and/or existence of secondary service provider 28 is shielded from user interface 22 by the temporary identity of primary service provider 26 so that user interface 22 is unaware of the role played by secondary service provider 28. At the same time, since user interface 22 is protected by their own temporary identity, the role played by secondary service provider 28 should be of little consequence to user interface 22.

In either method 250 or 300, a temporary identity is preferably generated randomly and assigned for each transaction between user interface 22 and service provider 26. Accordingly, a new temporary identity is issued for each transaction. However, other techniques optionally can be employed such as permitting the temporary identity to be used for a predetermined number of communications or for a predetermined period of time.

Figure 6:
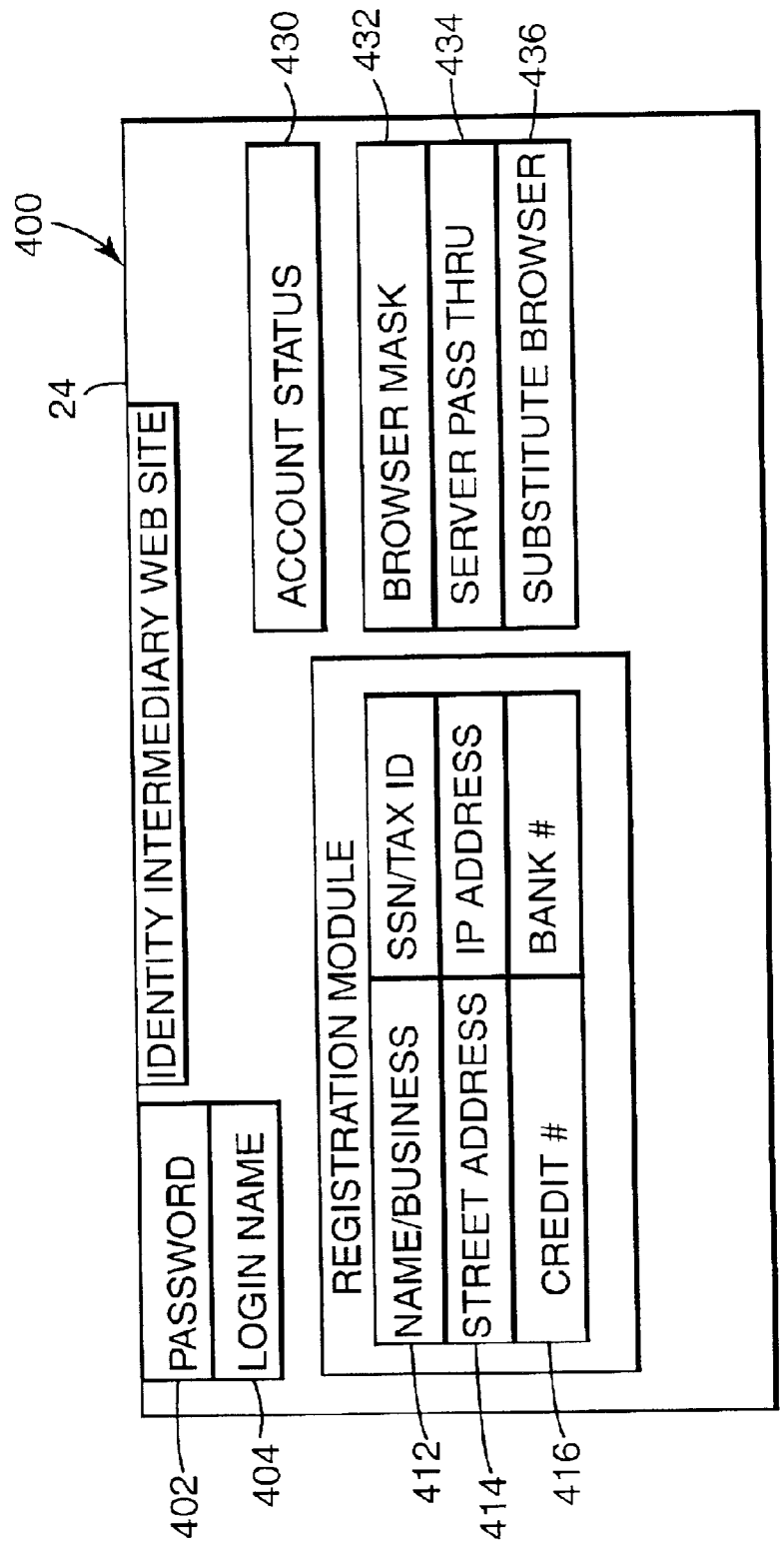
FIG. 6 is a block diagram of a web site of the identity intermediary system, according to one embodiment of the present invention.

To facilitate providing temporary identities, identity intermediary 24 operates a network site 400 (e.g, web site) for communicating with user interface 22 and service providers 26. As shown in FIG. 6, site 400 includes password function 402, login function 404 and registration module 410. Registration module 410 includes personal information 412, address information 414, and financial information 416. Personal information 412 includes a name or business and social security number or tax ID. Address information 414 includes a street address, IP address, or other physical or network location identification. Financial information 416 includes credit card numbers, bank account numbers or other financial identification information. Site 400 also includes account status function 430 to permit user interface 22 or service provider 26 to monitor their accounts with site 400.

Finally, site 400 includes identity selection module 431 including browser mask function 432, server pass-through function 434 and substitute browser function 436. Identity selection module 431 permits user interface 22 or service provider 26 to select a method by which the temporary identity is provided. For example, browser mask function 432 uses an existing browser of user interface 22 or network interface of service provider 26, combined with masking protocols to obscure the real identity of user interface 22 or service provider 26. Server pass-through function 434 provides a temporary identity by funneling all communications between interface 22 and service provider 26 through a server of identity intermediary 24 at which the real identity is blocked and a pseudonymous identity is applied to user interface 22 or service provider 26. Finally, substitute browser function 436 applies a temporary identity by rendering user interface 22 or service provider 26 as a temporary pseudonymous network interface such as a new browser. This pseudonymous browser preferably identifies identity intermediary 24 as the source for the browser so that all participants in a transaction with that browser recognize the trust engendered by identity intermediary 24 in that transaction.

Accordingly, from a method and system of the present invention for carries numerous advantages. The method and system of the present invention facilitates pseudonymous network transactions between a user interface and a service provider by providing at least one, or both of the user interface and the service provider with a temporary network identity that is unique and definite, but fictitious. Despite the fictitious nature of the temporary identity, the user interface and the service provider are willing to undertake the transaction because of the trust engendered by the nature and recognizable source of the identity intermediary that issues the temporary identity. The transaction can be an exchange of information only, or can also include financial information as well as location information. The identity intermediary also can perform financial transactions and delivery services between the user interface and the service provider to facilitate the transaction occurring pseudonymously. The fictitious identities are temporary and uniquely and randomly assigned for each transaction so that the identities cannot be co-opted by either partner to the transaction or by unscrupulous third parties.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for network communications comprising:
assigning a first temporary fictitious identity from an identity intermediary to a service provider;
performing a transaction between a user interface and the service provider using the first temporary fictitious identity.

2. The method of claim 1 wherein assigning a first temporary fictitious identity further comprises:
generating the first temporary fictitious identity randomly each time that the user interface and the service provider desire to enter a transaction with each other.

3. The method of claim 1 and further comprising:
associating the first temporary identity with the service provider;
providing the service provider as a primary service provider and linking the primary service provider to a secondary service provider, which assists the primary service provider in providing at least one of information, goods, and services to the user interface; and
performing the transaction with the first temporary fictitious identity to conceal the existence of, and real identity of, the secondary service provider from the user interface.

4. The method of claim 1 and further comprising:
associating a second temporary identity with the user interface;
providing the service provider as a primary service provider and linking the primary service provider to a secondary service provider, which assists the primary service provider in providing at least one of information, goods, and services to the user interface; and
performing the transaction with the second temporary fictitious identity to conceal the real identity and private information of the user interface from the secondary service provider.

5. The method of claim 4 and further comprising:
concealing a real identity of a consumer using the user interface with the second temporary fictitious identity by at least one of following techniques:
masking a browser of the user interface with the second temporary fictitious identity;
passing all communications of the user interface through a server of the identity intermediary to assign the second temporary identity and obscure the real identity of the user interface from the service provider; and
assigning the user interface a substitute browser with a pseudonymous name recognizably issued by the identity intermediary.

6. The method of claim 1 and further comprising:
assigning a second temporary fictitious identity from the identity intermediary to the user interface;
performing the transaction between the user interface and the service provider using the first and second temporary fictitious identities of the service provider and the user interface, respectively;
establishing a link to a financial services network to facilitate the identity intermediary performing the transaction as a financial transaction between the user interface and the service provider without revealing real financial information about a consumer using the user interface to the service provider and about the service provider to the user interface.

7. A method of network communications comprising:
contacting an identity intermediary with a service provider to obtain a first temporary network identity for the service provider including:
assigning, via the identity intermediary, the temporary network identity to include at least one of a personal component, a financial component, and a location component; and
associating, via the identity intermediary, the personal component with a real name of a consumer, associating the financial component with at least one of a real credit card number and a bank number, and associating the location component with at least one of a physical street address and an IP address; and
preventing, via the identity intermediary, unauthorized access to a database of the identity intermediary that maintains the personal, financial, and location components; and
contacting an user interface with the first temporary network identity of the service provider to provide services pseudonymously to the user interface.

8. The method of claim 7 and further comprising:
contacting the identity intermediary a second time to obtain a second temporary network identity for the service provider; and
contacting the user interface a second time with the second temporary network identity of the service provider to provide services pseudonymously to the user interface.

9. A method of network communications comprising:
contacting a service provider with a user interface;
prior to conveying personal information to the service provider, contacting an identity intermediary with the user interface to obtain a temporary network identity for the user interface; and
performing a transaction between the user interface and the service provider using the temporary network identity of the user interface to conceal a real identity of a consumer using the user interface.

10. The method of claim 9 and further comprising:
carrying out the transaction by having the identity intermediary use the real identity of the consumer associated with the user interface to arrange delivery of at least one of information and goods/services to the real consumer from the service provider while maintaining the user interface as fictitious identity relative to the service provider.

11. A method of providing pseudonymous network identities comprising:
randomly generating a first temporary fictitious identity for a first service provider; and
maintaining a database of a plurality of temporary fictitious identities, including the first temporary fictitious identity, with each temporary fictitious identity being associated with a uniquely identified service provider, including the first service provider.

12. The method of claim 11 and further comprising:
after a predetermined number of network communications involving the first temporary fictitious identity, replacing the first temporary fictitious identity with a randomly generated second temporary fictitious identity for association with the first service provider.

13. The method of claim 12 wherein replacing the first temporary fictitious identity occurs after a single communication of the first service provider with a user interface using the first fictitious temporary identity.

14. A network identity intermediary comprising:
a network site for communicating with a service provider; and
a database configured for maintaining at least one temporary pseudonymous identity in association with a real identity of the service provider;
wherein the network site is configured for assigning the temporary pseudonymous identity to the service provider upon a request by the service provider.

15. A temporary network identity comprising:
a unique pseudonymous identifier temporarily associated with a service provider; and
an identifier source name associated with the pseudonymous identifier for identifying the source that generated the unique pseudonymous identifier.

16. The temporary network identity of claim 15 wherein the unique pseudonymous identifier has a predetermined lifespan determined by at least one of a time period, a number of network communications between interface and the service provider, and a single interaction between a user interface and the service provider.

17. A network identity intermediary database comprising:
an array of unique pseudonymous identifiers;
an array of real identities of consumers and service providers including at least one of financial information, personal information, and location information, with each one of the real identities being exclusively associated with only one of the unique pseudonymous identifiers.

18. The network database of claim 17 and further comprising:
an encryption mechanism for concealing an association scheme between the unique pseudonymous identifiers and the real identities.

19. A method of network communications comprising:
contacting an identity intermediary with a user interface, after an initial contact between the user interface and a service provider, to obtain a first temporary network identity for the user interface;
contacting the service provider with the first temporary network identity of the user interface to receive services pseudonymously from the service provider; and
charging at least one of the user interface and the service provider a fee for the temporary network identity.

20. A method of pseudonymous network communication comprising:
creating a temporary fictitious identity for each of a service provider and a user interface for pseudonymously performing a transaction between the user interface and the service provider using the temporary fictitious identity; and
obtaining a fee from at least one of the user interface, the service provider and an advertising sponsor for the temporary fictitious identity.

21. A network identity intermediary database comprising:
an array of unique pseudonymous identifiers being configured so that each identifier will be associated exclusively with a real identity of each consumer of a plurality of consumers and each first service provider of a plurality of service providers; and
a subscriber mechanism for assigning the identifiers to the plurality of consumers and the service providers based on a fee-for-service contractual relationship based on at least one of a first arrangement between the consumer and the service provider, a second arrangement between the consumer and an identity intermediary for creating the identifiers, and a third arrangement between the service provider and the identity intermediary.

22. A pseudonymous network identity system comprising:
a network identity intermediary configured for communicating with a user interface and a service provider and configured for assigning a different temporary pseudonymous identity to each of a user interface and a service provider;
a database configured for maintaining at least one different temporary pseudonymous identity in association with a real identity of each of the user interface and the service provider; and
a fee mechanism configured for obtaining payment from the user interface and the service provider in association with maintaining the database and assigning the identities.

23. A computer-readable medium having computer-executable instructions for performing a method of facilitating network communications, the method comprising:
assigning a first temporary fictitious identity from an identity intermediary to a service provider;
performing a transaction between a user interface and the service provider using the first temporary fictitious identity.

24. The computer readable medium of claim 23 wherein the method of facilitating network communications further comprises:
associating the first temporary identity with the service provider;
providing the service provider as a primary service provider and linking the primary service provider to a secondary service provider, which assists the primary service provider in providing at least one of information, goods, and services to the user interface; and
performing the transaction with the first temporary fictitious identity to conceal the existence of, and real identity of, the secondary service provider from the user interface.

25. The computer readable medium of claim 23 wherein the method of facilitating network communications further comprises:
associating a second temporary identity with the user interface;
providing the service provider as a primary service provider and linking the primary service provider to a secondary service provider, which assists the primary service provider in providing at least one of information, goods, and services to the user interface; and
performing the transaction with the second temporary fictitious identity to conceal the real identity and private information of the user interface from the secondary service provider.

26. A computer-readable medium having computer-executable instructions for performing a method of network communications, the method comprising:
contacting an identity intermediary with a service provider to obtain a first temporary network identity for the service provider including:
assigning, via the identity intermediary, the temporary network identity to include at least one of a personal component, a financial component, and a location component; and associating, via the identity intermediary, the personal component with a real name of a consumer, associating the financial component with at least one of a real credit card number and a bank number, and associating the location component with at least one of a physical street address and an IP address; and preventing, via the identity intermediary, unauthorized access to a database of the identity intermediary that maintains the personal, financial, and location components; and contacting an user interface with the first temporary network identity of the service provider to provide services pseudonymously to the user interface.

27. A computer-readable medium having computer-executable instructions for performing a method of network communications, the method comprising:

contacting a service provider with a user interface;

prior to conveying personal information to the service provider, contacting an identity intermediary with the user interface to obtain a temporary network identity for the user interface; and performing a transaction between the user interface and the service provider using the temporary network identity of the user interface to conceal a real identity of a consumer using the user interface.

28. A computer-readable medium having computer-executable instructions for performing a method of providing pseudonymous network identities, the method comprising:

randomly generating a first temporary fictitious identity for a first service provider; and maintaining a database of a plurality of temporary fictitious identities, including the first temporary fictitious identity, with each temporary fictitious identity being associated with a uniquely identified service provider, including the first service provider.

29. A computer-readable medium having computer-executable instructions for performing a method of operating a network identity intermediary, the method comprising:

providing a network site for communicating with a service provider; and maintaining a database in cooperation with the network site for associating at least one temporary pseudonymous identity with a real identity of the service provider; and assigning the temporary pseudonymous identity to the service provider upon a request at the network site by the service provider.

30. A computer-readable medium having computer-executable instructions for performing a method of providing temporary network identities, the method comprising:

associating a unique pseudonymous identifier temporarily with a service provider; and associating an identifier source name with the pseudonymous identifier for identifying the source that generated the unique pseudonymous identifier.

31. A computer-readable medium having computer-executable instructions for performing a method of providing a network identity intermediary database, the method comprising:

maintaining an array of unique pseudonymous identifiers;

maintaining an array of real identities of consumers and service providers including at least one of financial information, personal information, and location information, with each one of the real identities being exclusively associated with only one of the unique pseudonymous identifiers.

* * * * *

UNITED STATES PATENT AND TRADEMARK OFFICE
CERTIFICATE OF CORRECTION

PATENT NO. : 6,937,976 B2
DATED : August 30, 2005
INVENTOR(S) : Apte

It is certified that error appears in the above-identified patent and that said Letters Patent is hereby corrected as shown below:

Column 11,
Line 20, after "between", insert -- a user --.
Line 21, delete the second "a" and insert therefor -- the --.

Signed and Sealed this

Twentieth Day of December, 2005

JON W. DUDAS
*Director of the United States Patent and Trademark Office*